United States Patent
Suwito

(10) Patent No.: US 7,307,813 B1
(45) Date of Patent: Dec. 11, 2007

(54) APPARATUSES AND METHODS FOR IMPROVING DISK PACK BALANCING IN DISK DRIVES INCLUDING METHODS FOR CENTERING DISK CLAMPS

(75) Inventor: Wantjinarjo Suwito, Longmont, CO (US)

(73) Assignee: Maxtor Corporation, Scotts Valley, CA (US)

( * ) Notice: Subject to any disclaimer, the term of this patent is extended or adjusted under 35 U.S.C. 154(b) by 563 days.

(21) Appl. No.: 10/955,800

(22) Filed: Sep. 29, 2004

Related U.S. Application Data

(60) Provisional application No. 60/509,300, filed on Oct. 7, 2003.

(51) Int. Cl.
*G11B 17/028* (2006.01)
(52) U.S. Cl. .................................. 360/98.08
(58) Field of Classification Search ............. 360/98.08, 360/99.05, 99.12
See application file for complete search history.

(56) References Cited

U.S. PATENT DOCUMENTS

| | | | | |
|---|---|---|---|---|
| 5,249,090 A | | 9/1993 | Fehse ..................... | 360/98.08 |
| 5,486,961 A | * | 1/1996 | Boutaghou et al. ...... | 360/99.12 |
| 5,490,024 A | * | 2/1996 | Briggs et al. ............ | 360/99.12 |
| 5,548,457 A | | 8/1996 | Brooks et al. ........... | 360/98.08 |
| 5,940,244 A | * | 8/1999 | Canlas et al. ............ | 360/98.08 |
| 6,172,844 B1 | * | 1/2001 | Luo et al. ................ | 360/98.08 |
| 6,462,902 B1 | | 10/2002 | Luo et al. ................ | 360/99.12 |
| 6,550,328 B1 | | 4/2003 | Horning et al. ............... | 73/468 |
| 6,563,668 B1 | * | 5/2003 | Suwito .................... | 360/98.08 |
| 6,603,636 B2 | * | 8/2003 | Schwandt et al. ....... | 360/99.12 |
| 6,624,967 B1 | * | 9/2003 | Suwito .................... | 360/98.08 |
| 6,624,968 B1 | | 9/2003 | Chessman et al. ....... | 360/99.12 |
| 6,724,568 B1 | | 4/2004 | Suwito et al. ........... | 360/99.12 |
| 6,757,132 B1 | * | 6/2004 | Watson et al. ........... | 360/99.12 |
| 2002/0034041 A1 | * | 3/2002 | Luo et al. ................ | 360/99.12 |

\* cited by examiner

*Primary Examiner*—Tianjie Chen
(74) *Attorney, Agent, or Firm*—Shumaker + Sieffert, P.A.

(57) ABSTRACT

Apparatuses and methods for improving disk pack balancing are provided including methods for centering disk clamps. One method to center a clamp is to modify the construction of the disk clamp to incorporate a centering flange located on the inner diameter and near an upper surface of the clamp. The hub assembly may also be modified to include an upper chamfer and an annular groove or notch to reduce the amount of potential surface contact between the centering flange of the disk and the outer diameter of the hub, thereby minimizing contamination caused by contact between the disk clamp and hub. Another method for improving disk pack balancing as well as general disk pack robustness is use of a modified hub assembly construction wherein an over-molded section includes a plurality of centering tabs that precisely align spacers and data storage disks within the disk pack.

14 Claims, 5 Drawing Sheets

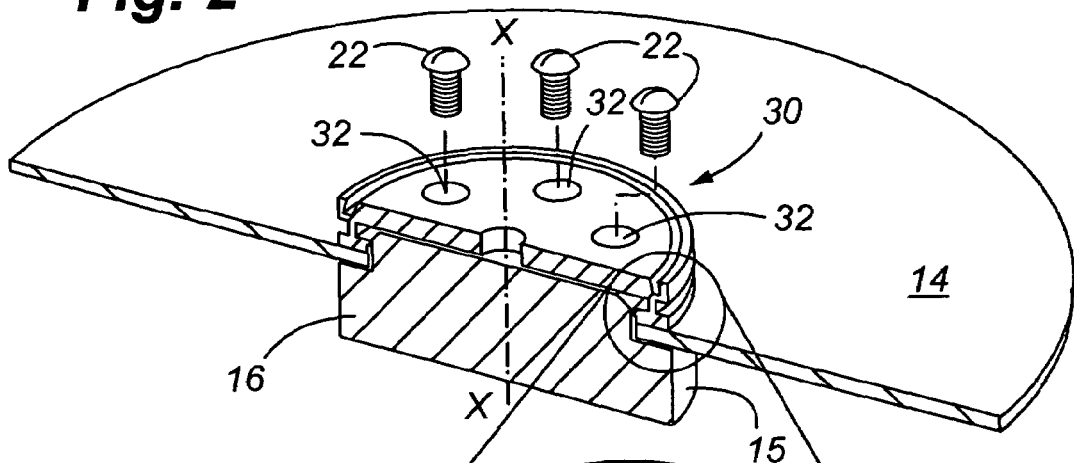
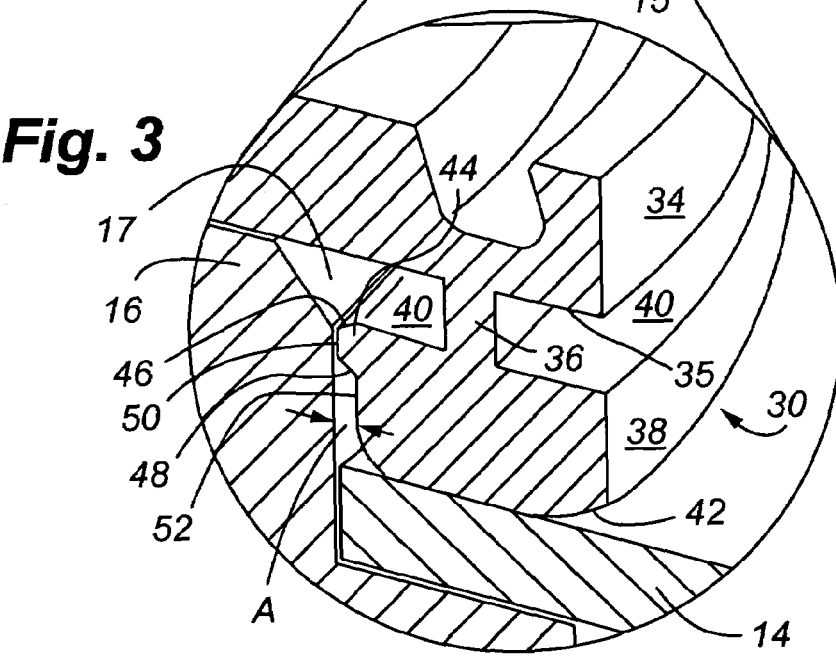
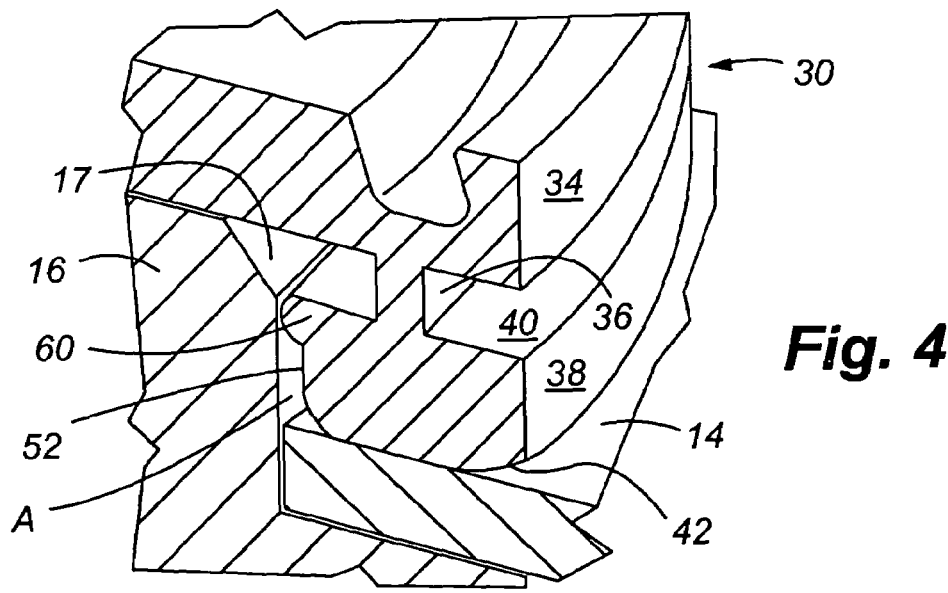

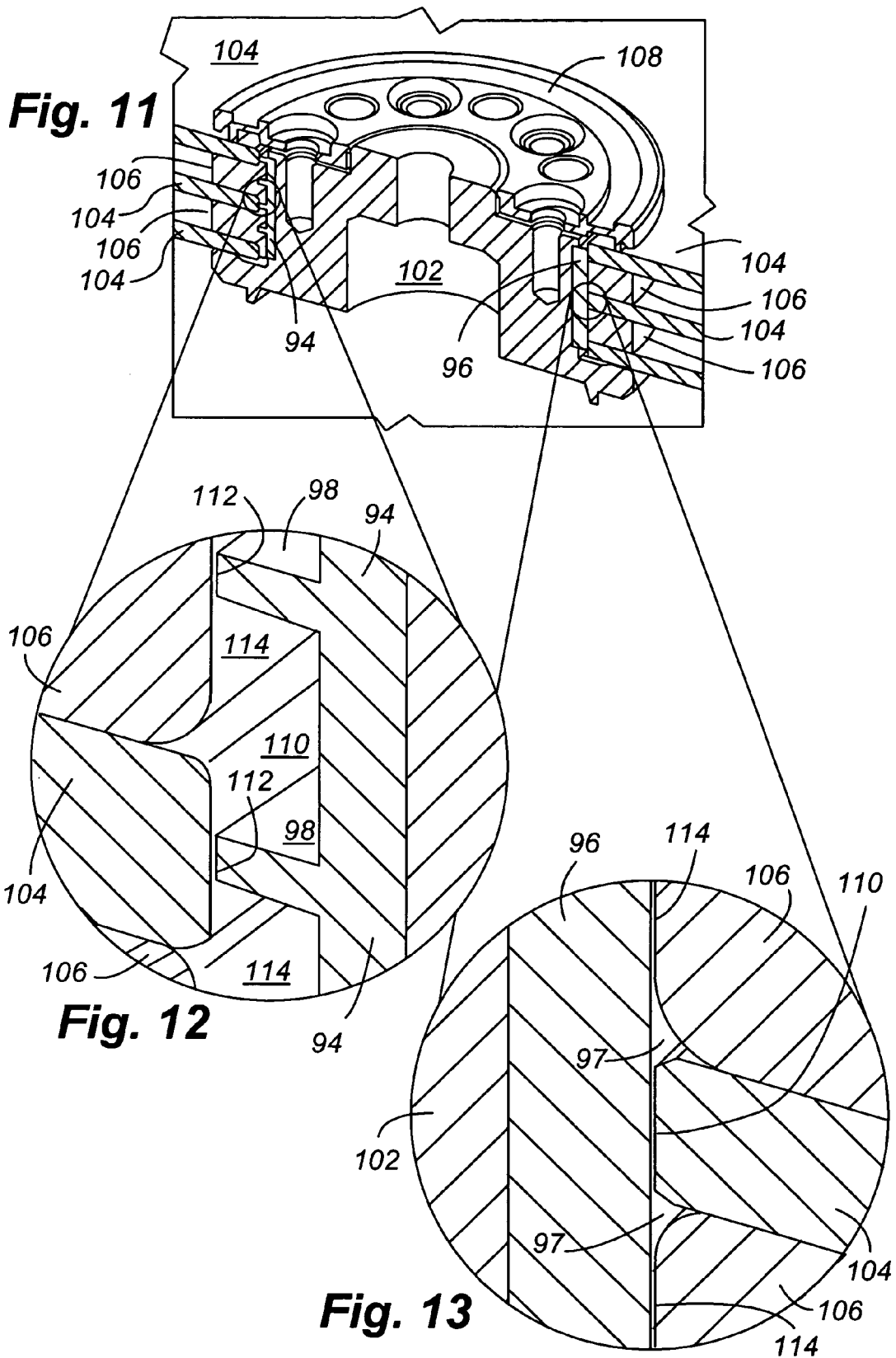

APPARATUSES AND METHODS FOR IMPROVING DISK PACK BALANCING IN DISK DRIVES INCLUDING METHODS FOR CENTERING DISK CLAMPS

CROSS REFERENCE TO RELATED APPLICATION

This application claims priority from U.S. provisional application entitled Methods for Centering Disk Clamps", filed on Oct. 7, 2003 and having Ser. No. 60/509,300, the application being incorporated herein in its entirety by reference.

FIELD OF THE INVENTION

The present invention relates to methods of improving disk pack balancing in computer disk drives, and more particularly to methods for centering disk clamps having modified disk clamp constructions and hub assembly constructions which enable better alignment of disk clamps with respect to their corresponding disk packs within a disk drive. The present invention also relates to improved disk pack balancing by use of an over-molded hub assembly with integral centering features.

BACKGROUND OF THE INVENTION

Disk drive storage devices typically include one or more data storage disks that are used to store information allowing a installer to read and write information from the disks. A disk pack refers to a plurality of data storage disks incorporated within a disk drive. The disks are stacked over one another and separated as by spacers. The disk pack is mounted over a hub assembly. A clamp secures the disk pack to the hub assembly. The disk pack is driven by a spindle motor which rotates the disks as a unit.

Various types of disk clamps can be used to secure the disk pack. One general type of clamp are those which utilize fasteners such as screws to secure the clamp to the hub. Another general type of clamp is one which does not use fasteners, and rather utilizes a retaining ring that is wedged between the central bore of the disk clamp and an annular undercut or groove formed on the outer surface of the hub.

Most manufacturing processes utilize manual installation of a disk clamp over a hub. It is possible to install the clamp through an automated assembly step (for example, by use of robotic assembly); however, because of the relatively small difference in the outer diameter of the hub versus the central bore in the clamp, the cost to incorporate the automated assembly step by use of precision robotics can be prohibitive; it is still more cost effective in most instances to simply use manual installation.

When installing the disk clamp, there are important considerations to account for that may ultimately affect the performance of the disk drive. One consideration is to reduce the amount of scraping contact that occurs between metal components thereby minimizing production of particulates which contribute to disk drive contamination. Another consideration is to provide installation of the disk clamp so that the disk clamp is precisely centered over the disk pack thereby minimizing overall imbalance of the disk pack. If a disk clamp is properly centered over the disk pack, then undesirable disk deflection, commonly referred to as "disk coning", can be reduced thereby improving drive performance. If a clamp is not centered over the disk pack, then the disk clamp when secured will generate uneven forces across the disks thereby contributing to disk coning.

Regardless of the particular manufacturing process, it is desirable to provide a disk clamp having a construction conducive to being more easily centered over the disk pack. One obvious solution might be to simply reduce the gap between the outer diameter of the hub and the inner diameter of the clamp. However, an adequately sized gap must still exist between the inner diameter of the clamp and the outer diameter of the hub so that binding between the clamp and the hub does not occur when installing the clamp. Binding between the clamp and the hub causes production of particulates and therefore can create disk drive contamination. While a more centered disk clamp may provide better disk pack balancing and less disk deflection, centering of the disk clamp over the hub should not be achieved at the cost of creating contamination by increased scraping contact between the clamp and the hub.

Therefore, there is a general need to improve disk pack balancing and to limit disk deflection. There is also a need for providing a disk clamp that has integral centering features, yet does not compromise drive performance by introducing undue contamination during clamp installation. There is yet a further need to provide the centering features with different types of disk clamp constructions to accommodate various disk drive configurations. For example, a multiple disk configuration within a disk pack may correspond to a disk drive which is not particularly constrained with respect to overall height of the drive, commonly referred to as the "z-height". On the other hand, some disk drives have a very constrained z-height, and accordingly, disk clamps used in these drives have a flatter shape to accommodate the z-height constraint.

SUMMARY OF THE INVENTION

In accordance with the present invention, methods are provided for balancing disk clamps and centering disk clamps which correspond to various types of disk clamp constructions and hub constructions. These methods provide inherent centering capability for installation of a disk clamp, yet do not compromise drive performance by increasing the likelihood of contamination. Also in accordance with the present invention, an over-molded hub assembly is provided to improve general disk pack balancing.

In a first preferred embodiment of the present invention, an integrated spacer clamp is provided having a centering feature in the form of a centering flange disposed on an inner diameter of the spacer. In a second preferred embodiment of the present invention, a flat disk clamp is provided having a centering feature in the form of a centering flange formed on an inner diameter of the clamp.

In yet another embodiment of the present invention, the above described centering features can be used in combination with a modified hub construction including an annular groove formed on an outer diameter of the hub, the annular groove located so that the clamp will not contact the outer diameter of the hub as fasteners are tightened to secure the clamp to the hub.

In yet another preferred embodiment of the present invention, the over-molded hub assembly is provided comprising a hub core and an over-molded section covering the core. The over-molded section has integrally molded centering features formed thereon. These centering features include a plurality of stops and centering tabs formed on the outer diameter of the over-molded section. The stops extend along the z-height of the hub assembly, and the centering tabs are spaced along the outer diameter at the locations where spacers and disks are positioned over the hub. The centering tabs extend radially outward from the over-molded section and are sized to make contact with the inner diameters of the spacers and disks, thereby precisely aligning the spacers and disks over one another for improved disk pack balancing. The over-molded section is preferably composed of a low out gassing polycarbonate material.

Additional features and advantages of the invention will become apparent from a review of the drawings, taken in conjunction with the following detailed description.

BRIEF DESCRIPTION OF THE DRAWINGS

FIG. 2 is a fragmentary perspective view of a first embodiment of the present invention in the form of an integrated spacer clamp;

FIG. 3 is an enlarged view of a portion of FIG. 2 illustrating the centering feature;

FIG. 4 is another enlarged view of the portion of FIG. 2 but showing a modification to the centering feature of FIG. 3;

FIG. 11 is a cross section of the over-molded hub assembly taken along line 9-9 of FIG. 9;

FIG. 12 is an enlarged view of a portion of FIG. 11 illustrating in more detail the centering features of the over-molded hub assembly; and FIG. 13 is another enlarged view of a portion of FIG. 11 further illustrating the centering features of the over-molded hub assembly.

DETAILED DESCRIPTION OF THE DRAWINGS

Figure 1:
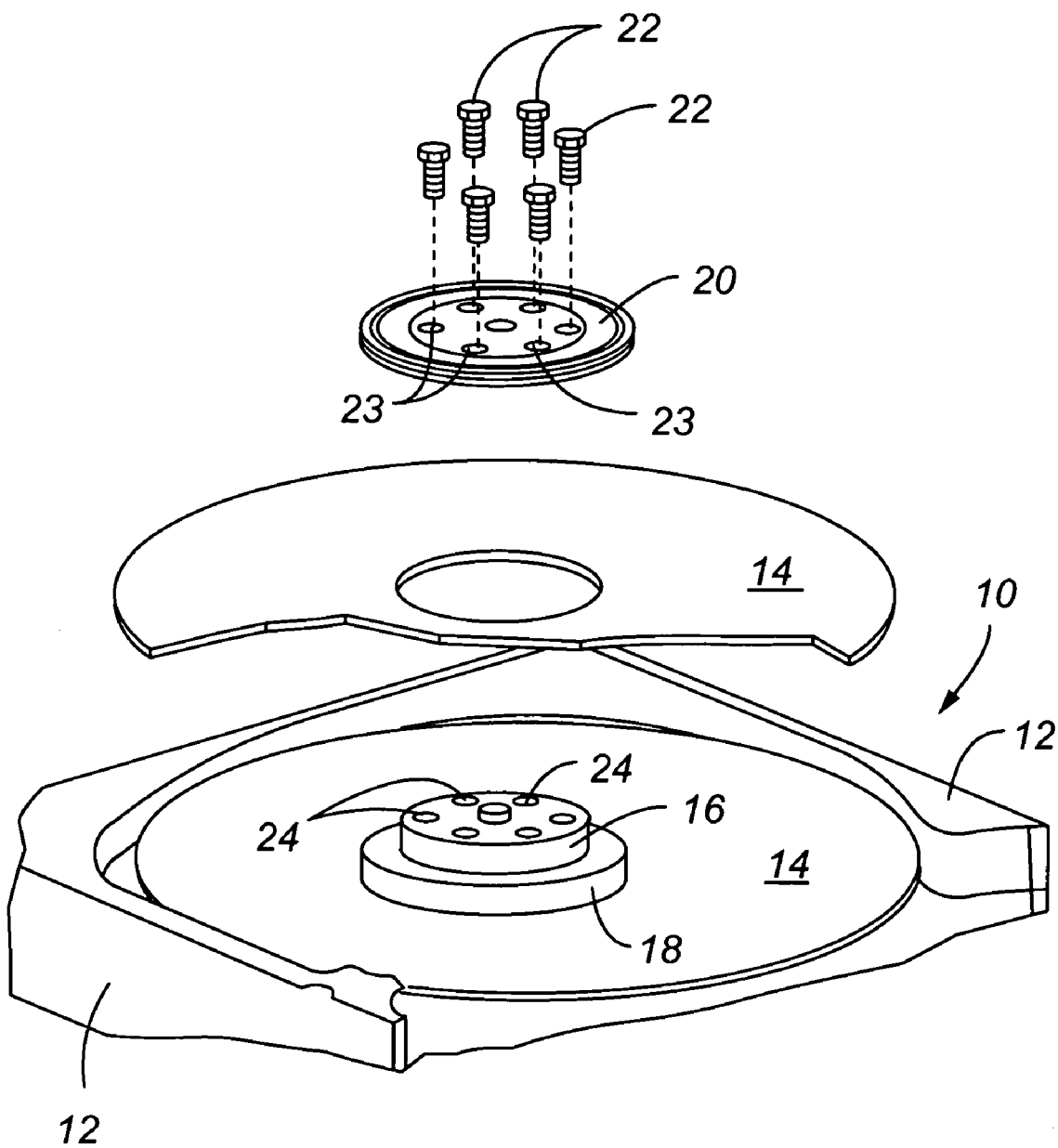
FIG. 1 is a simplified fragmentary perspective view of a prior art disk drive.

FIG. 1 illustrates part of a prior art disk drive assembly 10. The disk drive includes a base 12, and a hub 16 mounted to the base and driven by a spindle motor (not shown). One or more data storage disks 14 are mounted over the outer diameter of the hub 16. A spacer 18 is typically placed between disks 14. A disk clamp 20 is placed over the hub 16, and a plurality of fasteners 22 are used to secure the clamp to the hub. The fasteners are placed in corresponding threaded openings 24 formed on the upper surface of the hub.

Referring now to FIG. 2, the integrated spacer clamp 30 of the present invention is shown mounted over a hub 16. The spacer clamp includes a clamp 34, a spacer 38, and a neck or web 36 that interconnects the spacer to the clamp. The web 36 is continuous and extends circumferentially adjacent the respective peripheries of the clamp and spacer. The web 36 has a first end that terminates at the lower surface 35 of the clamp, and a second opposite end that terminates at the upper surface 40 of the spacer. The clamp 30 includes a plurality of openings 32 which may receive fasteners 22. The lower surface 42 of the clamp rests upon a disk 14 disposed below the spacer clamp 30.

Now referring to FIG. 3, the centering feature of this embodiment includes a centering flange 44 which protrudes radially inward and beyond an inner diameter of the clamp defined by wall section 52. The centering flange 44 may be further described as including an upper curved surface 46, a lower curved surface 48, and an interior surface 50 interconnecting the upper and lower curved surfaces. Surfaces 46 and 48 may also be referred to as rounded or curved projections.

The centering flange 44 allows an installer to better center the clamp over the hub. As the installer places the clamp over the hub, the initial gap between the outer diameter of the hub and the inner diameter of the spacer is defined by the gap A. As the clamp progresses over the hub, this gap decreases when the lower curved surface or projection 48 approaches the upper portion 17 of the outer diameter of the hub. The upper portion 17 may incorporate a chamfer as shown thereby providing a sloped transition for placement of the disk clamp. The chamfer reduces the potential amount of surface area contact between the flange 44 and the outer diameter of the hub as the clamp is lowered over the hub, since a larger gap exists between the flange and the hub. When the clamp is fully positioned over the hub, what remains is the smaller gap between surface 50 and the outer diameter of the hub. The rounded or curved projections of centering flange 44 help to eliminate undue scraping between the hub and the spacer as the clamp is lowered over the hub. The centering flange 44 is positioned adjacent the upper surface of the spacer 40 to minimize potential scraping contact between it and the outer diameter of the hub as the clamp is lowered over the hub. Potential contact of the centering flange against the outer diameter of the hub cannot occur until a substantial portion of the spacer is already placed over the hub thereby minimizing the amount of surface area contact between the two elements. Ultimately, the centering flange allows the integrated spacer clamp to be precisely centered over the disk pack yet the shape and location of the centering flange helps to prevent excessive scraping contact between the clamp and hub. A secondary benefit of the centering feature of the embodiment shown in FIGS. 2 and 3 is that the screw holes 32 will inherently be more aligned with the screw openings in the hub. Better alignment between the clamp screw holes and the screw openings in the hub also reduces unnecessary contamination that may occur if a screw is misaligned and strikes the upper surface of the hub near the screw opening.

FIG. 4 illustrates a modification to the embodiment of FIG. 2 wherein the centering feature is a centering flange 60 having a continuous curved or arcuate surface. The centering flange 60 may also be defined as a curved annular projection. Thus, in lieu of a centering flange having a compound shape such as centering flange 44 (which includes the upper and lower projections 46 and 48), the centering flange 60 is simply a continuous arcuate or curved shaped member. The same functions and advantages as discussed above with respect to the centering flange 44 also apply to the centering flange 60.

By centering the disk clamp as shown in FIGS. 2-4, the imbalance contribution of the clamp to the disk pack is minimized. Also, uneven forces generated and transferred to the disk pack when tightening the screws is kept to a minimum thereby promoting flatter and less distorted disk clamps.

Figure 5:
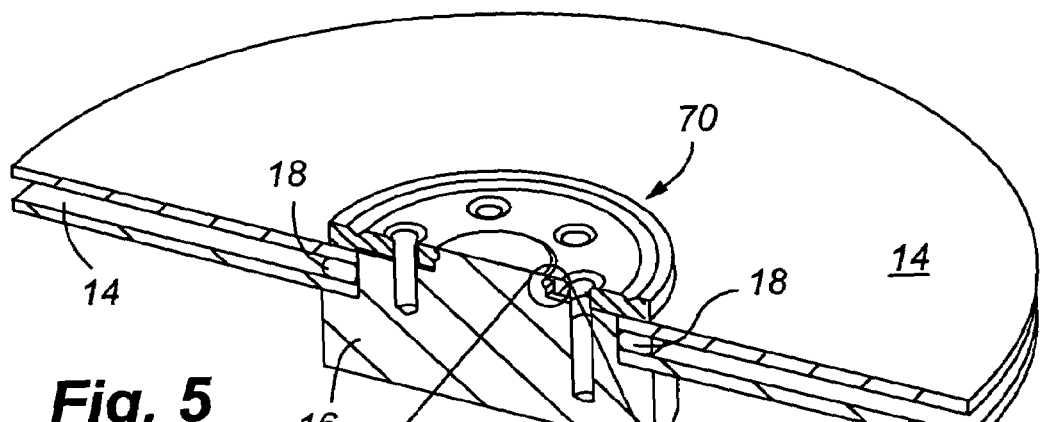
FIG. 5 is a fragmentary perspective view of a second embodiment of the present invention.
Figure 6:
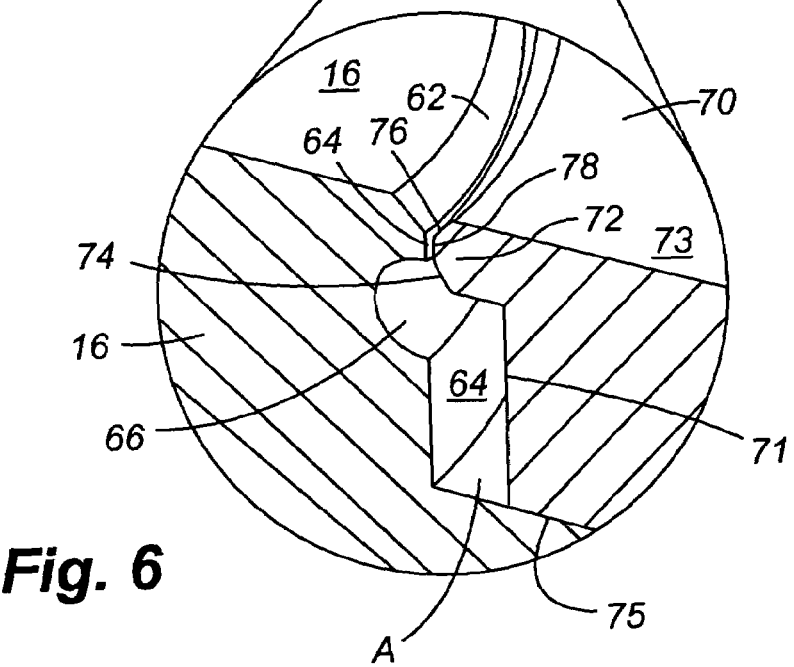
FIG. 6 is an enlarged view of a portion of FIG. 5 illustrating the centering feature.

Now referring to FIGS. 5 and 6, a second embodiment of the present invention is illustrated in the form of a flat disk clamp 70 not having an integrated spacer. The clamp 70 includes an upper surface 73, lower surface 75, and a central bore or opening defined by inner surface or wall 71. A centering flange 72 extends radially inward from surface 71. Flange 72 is positioned adjacent the upper surface 73. Centering flange 72 may be further defined as including an upper curved surface or projection 76, a lower curved surface or projection 74, and an interior surface 78 interconnecting the projections. Flange 72 is therefore shaped very similar to or the same as the centering flange 44 shown in FIG. 3. The functions and benefits of the flange 72 are the same as that set forth above with respect to centering flanges 44 and 60.

FIGS. 5 and 6 also illustrate a modified construction for the hub 16 wherein a chamfer 62 and an annular groove/channel 66 are provided. The chamfer 62 is formed at the intersection between the upper edge of the outer diameter 64 of the hub and the upper surface of the hub. The annular groove/channel 66 is formed below the chamfer on the outer diameter 64 of the hub. As with the chamfer 17, the chamfer 62 provides a sloped transition for placement of the disk clamp and thereby allowing the disk clamp to slide more easily over the hub if the flange 72 contacts the hub. Also, the chamfer reduces the potential or likely amount of surface area contact between the flange 72 and the outer diameter of the hub as the clamp is lowered over the hub since a larger gap exists between the hub and clamp at the location of the chamfer. The annular groove/channel 66 also reduces the potential or likely amount of surface area contact between the flange 72 and the outer diameter of the hub as the clamp is lowered over the hub. As shown, the groove/channel 66 is positioned so that it faces the lower projection 74 when the clamp is fully lowered over the hub.

Figure 7:
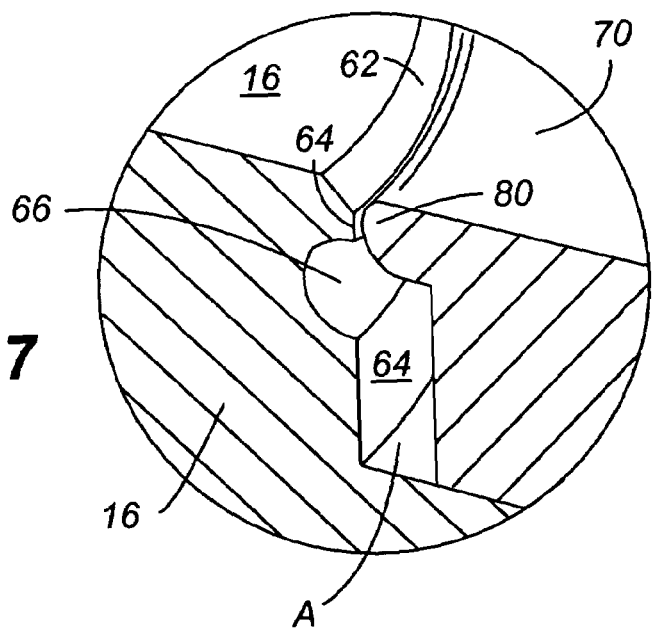
FIG. 7 is another enlarged view of the portion of FIG. 5 but showing a modification to the centering feature of FIG. 6.

Referring to FIG. 7, a modification to the centering flange 72 is shown as centering flange 80. Flange 80 has a curved or arcuate surface like the centering flange 60 shown in FIG. 4. Again, the same functions and advantages apply to the centering flange 80 as the other centering flanges discussed above.

Figure 8:
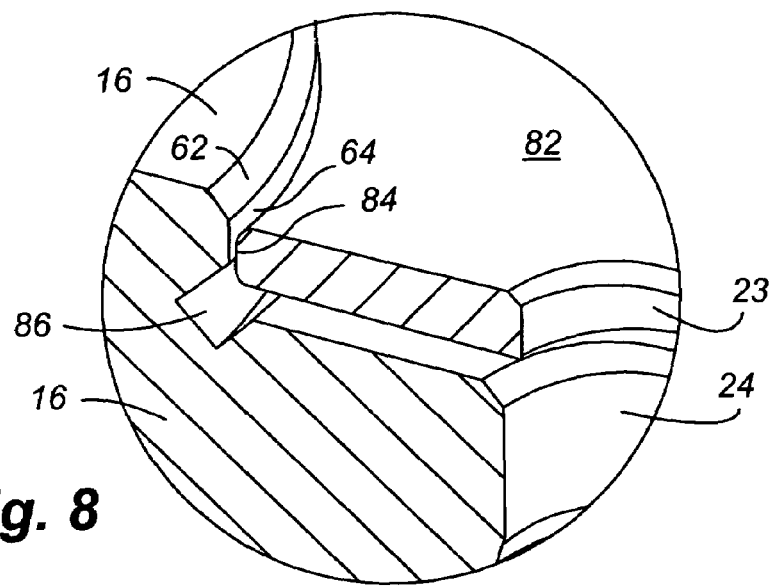
FIG. 8 is another enlarged view of the embodiment shown in FIG. 5 illustrating further modifications to the centering feature.

FIG. 8 illustrates yet another embodiment of the present invention wherein only the construction of the hub is modified to accommodate centering of the disk clamp. More specifically, FIG. 8 illustrates a standard flat disk clamp 82 having an inner diameter defined by surface 84. No centering flange or other feature is formed on the inner diameter. The hub 16 is of the same configuration as that shown in FIG. 6, except that the groove channel 66 is replaced in favor of an undercut or notch 86 as shown. As described above with respect to FIGS. 6 and 7, the chamfer 62 helps to reduces scraping contact of the clamp against the upper surface or upper edge of the hub. The notch 86 serves the same purpose as groove/channel 66 by limiting the potential surface area contact between the inner surface 84 of the clamp and the outer diameter 64 of the hub. Thus, the centering feature in FIG. 8 is simply a modification of the hub assembly, and does not require modification to the disk clamp.

In all of the embodiments discussed above, when screw type fasteners are used to secure the clamp to the hub, some deformation of the clamp will occur by moments generated by the fasteners when tightened. These moments may also result in some rotation or translation of the inner diameter of the clamp. A typical difference between the outer diameter of the hub and the inner diameter of a clamp is approximately 0.06 cm. Thus, a centered disk clamp will result in a gap of approximately 0.03 cm on each opposite side of the hub. If the clamp is not precisely centered over the hub, the moments generated by fasteners or screws when tightened can cause deflection of the clamp and therefore undesirable contact of the inner diameter of the clamp against the outer diameter of the hub. This contact can also create particulate contamination as well as further contribute to disk pack imbalance. By providing an additional gap or open space between the clamp and hub by groove 66 and notch 86, deflection of the clamp will not result in contact between the inner diameter of the clamp and the outer diameter of the hub.

Figure 9:
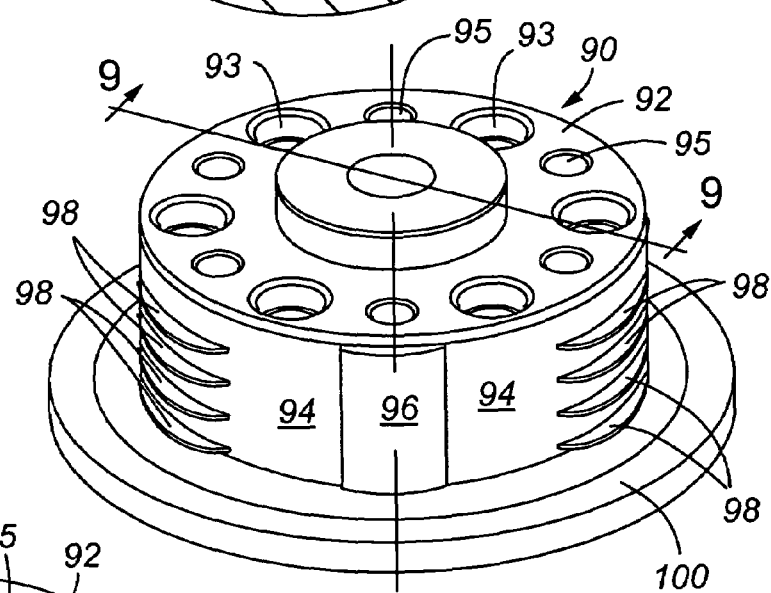
FIG. 9 is a perspective view of yet another embodiment of the present invention illustrating an over-molded hub assembly.
Figure 10:
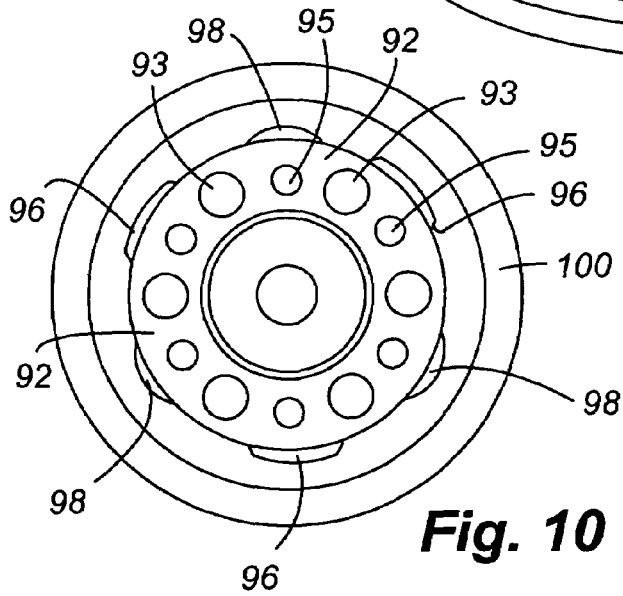
FIG. 10 is a plan view of FIG. 9.

Now referring to FIGS. 9-11, another embodiment of the present invention is illustrated in the form of an over-molded hub assembly 90. The hub assembly 90 includes two major components, namely, a hub core 102, and an over-molded section 94. The hub core is a metal component manufactured of the same type of material as conventional hubs. The over-molded section 94 is preferably made of a low out gassing polycarbonate material that is molded over the core. Known molding processes can be used for creation of the over-molded section. The over-molded section 94 includes features formed on the outer surface thereof, namely, a plurality of stop flanges 96 and a plurality of centering tabs 98. Preferably, three stop flanges 96 are provided which are spaced approximately 120° from one another around the outer diameter of the hub assembly. The upper edges of the stop flanges 96 extend to or closely adjacent to the upper surface of the hub assembly. Three groups of centering tabs 98 are placed between the stop tabs, and thus the groups of tabs are also spaced approximately 120° from one another along the outer diameter of the hub assembly. The groups of centering tabs are arranged in vertical columns, and each centering tab within a column is spaced along the height of the hub assembly. In the preferred embodiment, each group of tabs has the same number of tabs and each of the tabs are spaced at the same locations along the height of the hub assembly. Three centering tabs located at the same height along the hub can be referred to as a set of three planar centering tabs. Thus, in the embodiment shown in FIG. 9, there are four sets of three planar centering tabs spaced approximately 120° from one another and located at the same height along the hub assembly. The stop flanges 96 and the centering tabs 98 can be further described as fin shaped protrusions or arcuate shaped protrusions that extend substantially orthogonal/perpendicular to the outer surface of the hub assembly. The hub assembly 90 may also include one or more screw holes 93, and one or more balancing openings 95 on the upper surface thereof, although the over-molded hub assembly improves disk pack balancing to a degree that adding balancing weights may not be necessary. The hub base 100 is mounted to the base of a disk drive in a conventional manner, and coupled to a spindle motor for rotation of the hub assembly.

Referring to FIGS. 12 and 13, details are illustrated for an assembled disk pack that incorporates the over-molded hub assembly 90. When a disk 104 or spacer 106 is first placed over the hub, the stop flanges 96 provide general alignment. The effective diameter of the hub assembly at the stop flanges is smaller than the effective outer diameter of the hub assembly at the planar sets of centering tabs. As the disk 104 or spacer 106 is lowered further over the hub assembly, the disk or spacer will come into contact with one or more of the centering tabs until the disk or spacer is positioned so that its inner diameter abuts the peripheral edges 112 of the selected planar set of centering tab 98. FIG. 12 more specifically shows the inner diameter 114 of a spacer 106 in contact with the outer peripheral edge 112 of one centering tab 98, and shows the inner diameter 110 of a disk 104 in contact with the outer peripheral edge 112 of another tab 98, the disk being disposed below the spacer. FIG. 13 more specifically illustrates a stop flange 96 and the position of the disks 104 and spacers 106 adjacent the flange. Since the effective diameter of the hub at the stop flanges is less than the effective diameter of the hub at the centering tabs, a small gap will exist between the outer surface 97 of each stop flange and the respective inner diameters 110 and 114 of the respective disks 104 and spacers 106. The effective outer diameter of the hub assembly at the peripheral edges 112 of a set of three planar centering tabs equals that of the inner diameter of the data storage disks, or is slightly greater. Accordingly, there may be some slight deformation of the centering tabs 98 when positioning the disks and spacers. The tabs 98 serve as precise alignment guides ensuring that each disk and spacer is located at a desired position with respect to the axis of the hub assembly.

Because the over-molded section is preferably made of a polycarbonate material, contact between the inner diameters of the spacers and disks against the centering tabs 98 produces a negligible amount of particulates. Polycarbonate material is much less prone to create particulates in comparison to conventional hub surfaces that are composed of a metal. Yet, the polycarbonate has a sufficient yield and tensile strength to handle operating stresses and shock events.

A disk clamp 108 is also shown in FIG. 11 and installed over the disk pack. The particular construction of the disk clamp 108 may be any of the disk clamps described above, depending upon the particular z-height constraints of the disk drive. Of course, a conventional disk clamp could also be used but would not provide the above-mentioned benefits of the clamps with centering features.

In standard disk pack constructions, a disk pack is held in place by forces generated from the disk clamp. These forces are generally oriented in a direction orthogonal or perpendicular to the planes of the disks. By creating an interference fit between the centering tabs 98 and the inner diameters of the disks and spacers, forces to hold the disks and spacers are generated in a direction parallel to the planes of the disks and spacers. These planar forces do not contribute to disk coning since moments are not produced to create deflection of the disks and spacers. In other words, since a planar force is generated primarily through the moment axis of each disk and spacer, the actual production of moments is minimized. As understood by those skilled in the art, a moment is produced only when a force is applied to a member in a direction offset from the member's moment axis.

The advantages of the present invention are clear. Clamp centering reduces disk pack imbalance. Disk flatness is improved because disk coning is reduced. The modifications made to the above described disk clamp and hub constructions do not overly complicate production in standard machining techniques. Improved disk flatness and centering are achieved without sacrificing drive performance by increased contamination.

In the over-molded hub assembly, overall disk pack alignment and balancing is improved. An additional advantage obtained is increased shock robustness since the centering tabs also provide securing forces generated along the planes of the disks and spacers.

I claim:

1. An integrated spacer disk clamp for clamping one or more data storage disks to a hub of a disk drive, said integrated spacer clamp comprising:
    a clamp having an upper surface, a lower surface, and a center bore extending therethrough;
    a spacer offset below said lower surface of said clamp, said spacer having an upper surface, a lower surface, an outer peripheral surface, and an inner surface spaced radially inward from said outer peripheral surface, said inner surface being defined by a wall section extending substantially perpendicular from said lower surface of said spacer and by a centering flange formed on said inner surface above said wall section, said centering flange extending radially inward beyond said wall section towards an axis of said spacer disk clamp; and
    a neck interconnecting said clamp to said spacer.

2. An integrated spacer disk clamp, as claimed in claim 1, wherein:
    said centering flange is defined by (i) a lower curved surface extending radially inward from said wall section, (ii) an upper curved surface spaced from said lower curved surface, said upper curved surface extending radially inward from said upper surface of said spacer, and (iii) an interior surface interconnecting said upper and lower curved surfaces.

3. An integrated spacer disk clamp as claimed in claim 1, wherein:
    said centering flange is defined by a curved annular projection.

4. An integrated spacer disk clamp, as claimed in claim 1, wherein:
    said means for centering said clamp is defined by (i) a lower curved surface extending radially inward from said wall section, (ii) an upper curved surface spaced from said lower curved surface, said upper curved surface extending radially inward from said upper surface of said spacer, and (iii) an interior surface interconnecting said upper and lower curved surfaces.

5. An integrated spacer disk clamp as claimed in claim 1, wherein:
    said means for centering said clamp is defined by a curved annular projection.

6. An integrated spacer disk clamp for clamping one or more data storage disks to a hub of a disk drive, said integrated spacer clamp comprising:
    a clamp having an upper surface, a lower surface, and a center bore extending therethrough;
    a spacer offset below said lower surface of said clamp, said spacer having an upper surface, a lower surface, an outer peripheral surface, and an inner surface spaced radially inward from said outer peripheral surface, said inner surface being defined by a wall section extending substantially perpendicular from said lower surface of said spacer and by a means for centering said clamp formed on said inner surface above said wall section, said means for centering said clamp extending radially inward beyond said wall section towards an axis of said spacer disk clamp; and
    a neck interconnecting said clamp to said spacer.

7. A method of centering an integrated spacer disk clamp over a hub of a disk drive, said method comprising the steps of:
    providing a hub;
    providing an integrated spacer disk clamp including a clamp having an upper surface, a lower surface, and a center bore extending therethrough;
    (ii) a spacer offset below said lower surface of said clamp, said spacer having an upper surface, a lower surface, an outer peripheral surface, and an inner surface spaced radially inward from said outer peripheral surface, said inner surface being defined by a wall section extending substantially perpendicular from said lower surface of said spacer and a centering flange formed on said inner surface above said wall section, said centering flange extending radially inward beyond said wall section; and (iii) a neck interconnecting said clamp to said spacer; and lowering the clamp over the hub wherein said centering flange contacts said hub and aligns said clamp over said hub.

8. A disk clamp for clamping one or more data storage disk to a hub of a disk drive, said disk clamp comprising:

a clamp body having an upper surface, a lower surface, and a center bore extending therethrough, said clamp body further including an outer peripheral surface and an inner surface spaced radially inward from said outer peripheral surface, said inner surface defined by a wall section extending substantially perpendicular from said lower surface and by a centering flange positioned above said wall section, said centering flange extending radially inward beyond said vertical wall section towards an axis of said clamp.

9. A disk clamp, as claimed in claim 8, wherein:

said centering flange is defined by (i) a lower curved surface extending radially inward from said wall section, (ii) an upper curved surface spaced from said lower curved surface, said upper curved surface extending radially inward from said upper surface of said spacer, and (iii) an interior surface interconnecting said upper and lower curved surfaces.

10. A disk clamp as claimed in claim 8, wherein:

said centering flange is defined by a curved annular projection.

11. A disk clamp for clamping one or more data storage disk to a hub of a disk drive, said disk clamp comprising:

a clamp body having an upper surface, a lower surface, and a center bore extending therethrough, said clamp body further including an outer peripheral surface and an inner surface spaced radially inward from said outer peripheral surface, said inner surface defined by a wall section extending substantially perpendicular from said lower surface and by a means for centering said clamp positioned above said wall section, said means for centering said clamp extending radially inward beyond said vertical wall section towards an axis of said clamp.

12. A disk clamp, as claimed in claim 8, wherein:

said means for centering said clamp is defined by (i) a lower curved surface extending radially inward from said wall section, (ii) an upper curved surface spaced from said lower curved surface, said upper curved surface extending radially inward from said upper surface of said spacer, and (iii) an interior surface interconnecting said upper and lower curved surfaces.

13. A disk clamp as claimed in claim 8, wherein:

said centering flange is defined by a curved annular projection.

14. A method of centering a disk clamp over a hub of a disk drive, said method comprising the steps of:

providing a hub;

providing a disk clamp including a clamp body having an upper surface, a lower surface, and a center bore extending therethrough, said clamp body further including an outer peripheral surface and an inner surface spaced radially inward from said outer peripheral surface, said inner surface defined by a wall section extending substantially perpendicular from said lower surface and by a centering flange positioned above said wall section, said centering flange extending radially inward beyond said wall section towards an axis of said clamp; and lowering the clamp over the hub wherein said centering flange contacts said hub and aligns said clamp over said hub.

\* \* \* \* \*